United States Patent [19]

Kim

[11] Patent Number: 4,857,630
[45] Date of Patent: Aug. 15, 1989

[54] HYPERBRANCHED POLYARYLENE

[75] Inventor: Young H. Kim, Wilmington, Del.

[73] Assignee: E. I. Du Pont de Nemours and Company, Wilmington, Del.

[21] Appl. No.: 129,151

[22] Filed: Dec. 7, 1987

[51] Int. Cl.$^4$ .............................................. C08G 61/00
[52] U.S. Cl. ........................................ 528/397; 525/50; 525/185; 525/190; 525/389; 528/8; 528/9; 528/10; 528/15; 528/17; 528/19; 528/30; 528/36
[58] Field of Search ................... 528/397, 8, 9, 10, 15, 528/17, 19, 30, 36; 525/50, 185, 190, 389

[56] References Cited

U.S. PATENT DOCUMENTS

| | | | |
|---|---|---|---|
| 3,669,939 | 9/1972 | Baker et al. | 260/78 A |
| 4,289,872 | 9/1981 | Denkewalter et al. | 528/328 |
| 4,507,466 | 3/1985 | Tomalia et al. | 528/332 |
| 4,568,737 | 2/1986 | Tomalia et al. | 528/332 |
| 4,587,329 | 5/1986 | Tomalia et al. | 528/363 |
| 4,588,120 | 12/1985 | Tomalia et al. | 528/363 |

FOREIGN PATENT DOCUMENTS 8402705  7/1984  PCT Int'l Appl. .

OTHER PUBLICATIONS

P. J. Flory, J. Amer. Chem. Soc., 74, 2718 (1952).
Maciejewski, et al., Sci. Chem., A17(4), 689 (1982).
Miyaura et al., Synth. Comm., 11(7), 513 (1981).
Chen, et al., J. Organomet. Chem., 251, 149 (1983).
Thompson, et al., J. Org. Chem., 49(26), 5237 (1984).
Yamanoto et al., Bull. Chem. Soc. Japan, 51, 2091 (1978).
J. Lindley, Tetrahedron, 40(9), 1433 (1984).
I. P. Beletskaya, J. Organomet. Chem., 250, 551 (1983).

Primary Examiner—Harold D. Anderson

[57] ABSTRACT

Highly-branched, functionalized, wholly aromatic poly(arylenes) are prepared by the polymerization of $AB_n$-type aromatic monomers.

3 Claims, No Drawings

HYPERBRANCHED POLYARYLENE

BACKGROUND OF THE INVENTION

1. Field of the Invention

This invention relates to hyperbranched, functional poly(arylenes) and their preparation. References P. J. Flory J. Amer. Chem. Soc., 74, 2718 (1952); "Principles of Polymer Chemistry", Cornell University Press, 1953, pp 361-370, discusses the theory of condensation polymerization of so-called $AB_n$-type monomers wherein A and B functions condense together to form branched high polymers which attain high molecular weight without gelation. The theory predicts that polymerization of such monomers containing one A and nB functions leads to randomly branched polymers containing one unreacted A function and $(n-1)x+1$ unreacted B functions where x is the number of monomer units, said polymers being more polydisperse the higher the degree of polymerization. Examples of monomers of this type given by Flory are benzyl halides $XCH_2$—$C_6H_5$, alkali metal salts of trihalophenols and D-glucose; the polymers are said to be soluble, non-crystalline and fusible when correctly prepared. Fully aromatic monomers of the $AB_n$ type, or polymers therefrom, are not disclosed.

Denkewalter et al. U.S. Pat. No. 4,289,872 disclose highly branched polyamides composed of at least four successive layers of lysine units, prepared by polycondensation of selected amino or carbonyl functions. Baker et al. U.S. Pat. No. 3,669,939 disclose highly branched condensation polymers prepared from polyhydroxymonocarboxylic acids $(OH)_nR$—$CO_2H$ wherein R is a hydrocarbon radical of up to 22 carbon atoms optionally interrupted by a heteroatom, and n is 2-6. Monomers disclosed as particularly suitable are those of the formula $(HOCH_2)_2$—$C(R^3)CO_2H$ where $R^3$ is alkyl or —$CH_2OH$. Aromatic monomers are not exemplified and apparently not contemplated.

Tomalia et al. U.S. Pat. Nos. 4,587,329, 4,568,737, 4,588,120, 4,507,466 and WO 84/02705 disclose dense star polymers containing core, core branches and terminal groups. These polymers are built up, layer after layer, from a core substance by selective condensation of functional groups; each successive layer becomes a core for the subsequent layer. Only aliphatic polyamides and polyethers are exemplified. The monomers are of the AB type and the polymers therefrom are said to be soluble and to have a molecular volume less than 80% of that of a conventional extended star polymer made from similar materials, molecular diameters being less than 2000 angstrom units.

M. Maciejewski J. Macromol. Sci.-Chem., A17 (4), 689 (1982) describes his concept of so-called shell topological compounds, preparation of which includes polymerization of a monomer of the $XRY_n$ type, where n is at least 2. Such polymerization results in a "cascade branched (uncrosslinked) molecule of spherical structure". Equations are provided which correlate, among other properties, molecular weight with sphere diameter. Although monomers employed in the present invention are of the $XRY_n$ type, the reference does not suggest polymerization of arylene monomers or the physical properties of the polyarylenes therefrom.

Several aryl-aryl coupling reactions are known. Miyaura et al. Synth. Comm, 11(7), 513 (1981) disclose the Pd-catalyzed coupling reaction of phenyl boronic acid with aryl halides, including aryl bromides, to give the corresponding biaryls: $C_6H_5$—$B(OH)_2 + Br$—$C_6H_4$—$Z \rightarrow C_6H_4$—$Z$ where Z is an inert substituent. Arylboronic acids are said to have major advantages over other organometallic compounds for coupling reactions of this type, and are said to be available in wide variety through use of functionalizing reactions of the parent arylboronic acid, such as nitration, oxidation and halogenation. This reference also discloses Pd or Ni-catalyzed coupling between aryl halides and aryl magnesium or zinc compounds. Preparation of dihaloarylboronic acids from trihaloarylenes via mono lithium intermediates is known or obvious; lithium dibromobenzene preparation is disclosed by Chen et al., J. Organomet. Chem., 251, 149 (1983).

Thompson et al. J. Org. Chem., 49(26), 5237 (1984) disclose the coupling of arylboronic acids with 5-bromonicotinates to yield 5-arylnicotinates.

Yamamoto et al., Bull. Chem. Soc. Japan, 51, 2091 (1978) disclose coupling of aryl halides such as p-chloro and p-bromobenzene and 1,3,5-trichlorobenzene in the presence of magnesium and a compound of a transition metal such as Ni or Pd to give polymers. These monomers are of the $A_2$ or $A_3$ type wherein only like functions are involved. This reference also discloses non-polymerizing coupling of aromatic Grignard reagents RMgX and aryl halides R'X, catalyzed by a transition metal, to give the product R-R'; R and R' can be aryl.

J. Lindley, Tetrahedron, 40(9), 1433 (1984) discloses coupling of aryl halides with aryl copper compounds to form diaryl compounds. I. P. Beletskaya, J. Organomet. Chem., 250, 551 (1983) discloses aryl-aryl coupling of aryl halides with aryltrialkyltin compounds.

None of the prior art discloses highly branched, functionalized, wholly aromatic poly(arylenes) prepared by the polymerization of ABn-type aromatic monomers, nor suggest the properties exhibited by such polymers.

SUMMARY OF THE INVENTION

The present invention provides:

(1) A soluble hyperbranched polyarylene having (i) at least one branch per 10 monomer units; (ii) $(n-1)x+1$ functional groups selected from Br, I or Cl wherein n is the number of halogen atoms in the monomer and is at least 2, and x is the number of monomer units; and (iii) a spherical diameter of less than 1000 angstrom units ($10^{-4}$ mm), preferably less than 100 angstrom units ($10^{-5}$ mm);

(2) the polyarylene of (1) wherein the functional groups have been replaced by polar or non-polar substituents;

(3) the polyarylene of (2) wherein the substituents are essentially linear polymer radicals, each containing at least 3 repeat units, thus forming a star polymer;

(4) a blend comprising up to 50 mol % of the polyarylene of (1);

(5) a blend comprising up to 50 mol % of the polyarylene of (2);

(6) a process for preparing the polyarylene of (1) comprising polymerizing the arylene of the formula $Ar(X)_n M$ wherein:

Ar is an $(n+1)$ valent arylene radical containing at least one aromatic ring, said ring(s) optionally containing one or more substituents that are inert under polymerizing conditions;

X is Br, Cl or I; and

M is selected from —$B(OH)_2$, —MgX, —Cu, —Li and —$SnR_3$ where R is a hydrocarbyl group of 1 to 10 carbon atoms, and X and n are defined as above, in the presence of a catalyst which is an organopalladium(0) or organonickel(II) compound when M is —B(OH)$_2$, —MgX or —SnR$_2$, and an oxidizing agent such as a ferric or manganic salt when M is Li. No catalyst is required when M is —Cu.

DETAILS OF THE INVENTION

Arylene monomers useful in the invention process include those wherein Ar is monocyclic or polycyclic; the latter may be a fused ring system or a ring assembly or a combination thereof. Any of the monomers may optionally contain one or more substituents that are inert under polymerizing conditions. Preferably, Ar contains 1-4 unfused aryl rings with the n+1 valences extending symmetrically from outer ring extremities; preferably this Ar group is trivalent. Examples of preferred trivalent Ar radicals include 1,3,5-benzenetriyl, 3,5,4'-biphenyltriyl, 1,3,5-benzenetriyl-4',4'-bis(phenyl-) and 1,3,5-benzenetriyl-4,4',4''-tris(phenyl-). Preferred inert substituents include alkyl and alkoxyl having 1-4 carbon atoms.

Preferably X is Br or Cl and M is —B(OH)$_2$.

The arylene monomers used herein are either known compounds or can be prepared by known methods. The Grignard monomers wherein M is —MgX can be prepared by reacting a polyhalide containing at least three halogen substituents with one equivalent of Mg.

Monomers wherein M is —B(OH)$_2$ are prepared from the monolithium intermediate by treatment with trialkyl borate solution in a suitable solvent such as diethylether or tetrahydrofuran at a low temperature below about −20° C., preferably below about −50° C., followed by acidic hydrolysis.

Monomers wherein M is —M$^1$R$_3$ can be prepared from the lithium polyhalide intermediates, which are in turn prepared from polyhaloarylenes by reaction with a lithium alkyl as described by Chen et al., J. Organomet. Chem., 251, 149 (1983). Monomers wherein M is —Cu may also prepared from metallated (e.g. lithiated) polyhaloarylenes by reaction with a copper halide.

In the process of the invention, an arylene Ar(X)$_n$M is polymerized in a suitable solvent in the presence of a catalyst at a temperature of about 0° to about 150° C., preferably about 20° to about 100° C. Polymerization is conveniently carried out at the solvent's reflux temperature. Pressure is not critical, but atmospheric pressure is preferred. Suitable solvents include non-polar liquids such as toluene, xylene and 1-methyl naphthalene, and polar liquids such as tetrachloroethane, diphenyl ether, dimethylformamide and tetrahydrofuran. The catalyst employed depends on the identity of M in the monomer, as described above. When M is —B(OH)$_2$ or a derivative thereof, it is desirable to add a base such as sodium- or potassium carbonate, as demonstrated in the Examples.

Polymerization of arylene monomers of the formula Ar(X)$_2$M occurs by 1:1 coupling of X and M groups, and leads inevitably to a highly branched structure because X groups outnumber M groups by at least 2:1. Although the M functions listed above are known to be operable in the present invention process, it is believed that any chemoselective aryl-aryl coupling of polyhaloarylenes can lead to the desired hyperbranched polymers.

The polymers of the invention have number average molecular weight (Mn) in the range of about 1,000 to about 1,000,000, preferably about 2,000 to about 60,000.

Molecular weight and polydispersity have been found to depend on the solvent used for the polymerization, as shown in Example 1C.

The hyperbranched polyarylenes of the invention are essentially amorphous with very high glass transition temperatures (Tg). For example, the polymers prepared as described in Example 1 have Tg's of about 240° C. Moreover, the polymers are very stable, showing little tendency to decompose in air by thermogravimetric analysis (TGA) below about 550° C.; at 350°, for example, a weight loss of 4.5% was observed after 60 h with a polyarylene prepared in Example 1.

The hyperbranched polyarylenes are at least 10% branched, i.e. they contain at least one branch per 10 monomer units. Preferably the polymers are at least 25% branched. It is to be understood that the as-polymerized polyarylenes are wholly aromatic, containing no aliphatic groups or linkages. During polymerization only single bonds between arylene groups are formed. Essentially all of the residual X groups at the end of polymerization are believed to be located at the outer surfaces of the globular polyarylene molecules.

The polymers of the invention are also very soluble in certain organic liquids, including 1-methylnaphthalene, diphenyl ether, tetrahydrofuran (THF), tetrachlorethane (TCE) and o-dichlorobenzene. They are somewhat soluble in toluene, xylene and benzene. Because of their halogen functionality, the hyperbranched polymers can be reacted further via these functions with halogen-active reagents. One convenient method is to replace halogen with lithium by reaction with a lithium alkyl such as n-butyl lithium. The lithiated polymers then readily undergo anionic reactions at low temperatures (e.g. −78° C.) with a variety of electrophilic compounds to provide hyperbranched polymers having other desirable functions. Suitable electrophilic compounds include trialkylchlorosilanes, DMF, alkyl sulfates, ketones, alkyl chloroformates, aldehydes, and carbon dioxide.

Alternatively, the original halogen groups in the polymer can be reacted with Grignard compounds, preferably in the presence of a catalyst such a Ni (II) compound; e.g. a bromo functional polymer of the invention can be reacted with p-methoxyphenyl magnesium bromide, resulting in the replacement of bromo groups with p-anisole groups. In most instances, these derivatives are also soluble.

The derivatized polymers can be further modified by known chemical reactions, as will be apparent to those skilled in the art. For example, methoxyl groups in p-anisole derivatives of the invention polymers can be converted to hydroxy groups by reaction with BBr$_3$ in methylene chloride. Carboxyl groups can be reduced, e.g. by borane reduction, to hydroxymethyl groups which can, in turn, be converted to chloro- or bromomethyl groups by reaction with the appropriate halogenating agent. Alkali metal or ammonium salts of carboxy-functional hyperbranched polymers are soluble in water. Hydroxy and carboxy-functional polyarylenes have reduced solubility in non-polar solvents such as o-dichlorobenzene or TCE; however, the addition of a small amount of alcohol markedly increases solubility in such solvents.

The following is a non-limiting list of functional groups that have been introduced into polyarylenes of the invention by replacement of halogen to provide soluble derivatives: —H, —SiR$_3$ (R is C$_{1-30}$ alkyl), —R$^1$ (alkyl, aryl, alkaryl or aralkyl optionally substituted with alkyl, hydroxy or halogen groups), —C≡CR, —CH=CHR (R is H or alkyl or aryl or alkaryl or aralkyl or combinations thereof), —CH(OH)CH$_3$, —CHO, —CO$_2$R, —CO$_2$M' (M' is H, alkali metal or ammonium), —CH$_2$OH, —C(CH$_3$)$_2$OH, —CH$_2$X, —COX (X is halogen), —CH$_2$OR, —CH$_2$N(SiR$_3$)$_2$, —CN, —Si(OR)$_3$, —CH$_2$NHCHO, —NR$_2$', —CONR$_2$', —B(OR')$_2$, where R' is H or C$_{1-4}$ alkyl. The preferred functional groups are —H, —CH$_3$, —Si(CH$_3$)$_3$, —C≡CH, —CH$_2$OH, —CO$_2$H, —COCl, —CO$_2$Li and 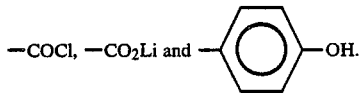

The hyperbranched polyarylenes may also be modified by grafting other polymers at a halogen-containing or derivatized site to form graft copolymers. For example, polymers having vinylic, acetylenic or aryl halide end groups can be linked to the present polymers; or polymers having electrophilic end groups can be linked to lithium-substituted polyarylenes.

The hyperbranched polyarylenes can also initiate polymerization from functionalized sites. For example, a polyarylene containing 1,1-dimethylcarbinol sites obtained by reacting the polyarylene lithium, prepared as described above, with acetone, can initiate cationic polymerization of many monomers such as butadiene, isoprene or styrene in the presence of Lewis acid catalysts. Alternatively, anionic polymerization of similar monomers can be initiated from lithiated sites or from magnesium chloromethyl sites; the latter are prepared by reacting chloromethyl sites in the hyperbranched polyarylene with freshly prepared magnesium.

Polymerization of monomers from functional sites in the present polyarylenes, or grafting of other polymers to such sites, leads to star copolymers, the number of arms of which is determined by the number of active sites in the "core" polyarylene. Such star copolymers frequently exhibit two Tg's reflecting the core and arm polymers. However, if the arms are long, i.e. having a degree of polymerization (DP) of at least 50, only a single Tg close to that of the linear homopolymer may be observed.

Anions from carboalkoxy or hydroxy-functional hyperbranched polyarylenes can also initiate ring-opening of cyclic monomers such as lactones, lactams, lactides or epoxides.

Star polymers prepared from hyperbranched polyarylenes of the invention are also soluble and are widely useful as dispersing agents or rheology control agents in paint or coating formulations. The initial polyarylenes, or derivatives thereof, including star polymers, may also be blended with other polymers so as to tailor desired properties. The large number of functional groups possible with the polyarylenes permits blending with a wide variety of other polymers. The presence of a high concentration of halogen in the initial polyarylenes render them excellent fire retarding agents for use in blends with other materials.

The addition of a polyarylene of the invention, preferably a halogen-functional polyarylene, to one or more different polymers, e.g. polystyrene or poly(methyl methacrylate), significantly increases the physical strength of the latter, at the same time reducing its melt viscosity (see Example 5B). It has also been found that the thermal stability of other polymers can be markedly increased by blending with minor amounts of a halogen-functional polyarylene.

The hyperbranched polyarylenes and derivatives thereof are spherical in conformation. The diameters of the polyarylenes can be calculated from the molecular weight and degree of polymerization using Maciejewski's equation modified for the appropriate aryl-aryl and aromatic C—C bond distances. Spherical conformation is known to result in unusually low viscosity in solution or the molten state for polymers of a given molecular weight. For this reason the present polyarylenes are especially useful as viscosity control agents in bulk or solution formulations with other polymers, as indicated above, and/or with other formulating ingredients.

In the following embodiments of the invention, parts and percentages are by weight and temperatures are in degrees Celsius unless otherwise specified. Molecular weights (weight $\overline{M}w$ and number $\overline{M}n$ average) were determined by gel permeation chromatography (GPC); polydispersity, D, is given by the ratio $\overline{M}w/\overline{M}n$. Degree of branching was determined by carbon nuclear magnetic resonance (CNMR). Thermogravimetric analysis (TGA) was used to determine polymer stability.

EXAMPLE 1

A. Preparation of 3,5-Dibromobenzene Boronic Acid

To 9.44 g of 1,3,5-tribromobenzene in 200 mL of diethyl ether was added 19.4 mL of 1.55 M n-butyllithium in hexane at −78° under nitrogen. The suspension was stirred for 30 min, then added to 30 mL of trimethyl borate in 300 mL of diethyl ether at the same temperature. The now clear solution was stirred at −78° for 30 min then warmed to room temperature overnight. Fifty mL of 1 N hydrochloric acid were added and allowed to react for 2 h. The aqueous layer was discarded and the ether layer was extracted with 2 N sodium hydroxide solution (5 times with 100 mL). The extract was washed once with 50 mL of ether, then acidified with 6N HCl to pH 2 at 0°. A white precipitate was collected by filtration after the solution had been kept at 0° for 2 h. After air drying, 8.49 g (95%) of the title product was obtained. Melting point was >300° and the purity was confirmed by chromatography.

B. Polymerization of 3,5-Dibromobenzene Boronic Acid

To a mixture of 50 mL of xylene, 20 mL of 1 M aqueous sodium carbonate solution and 30.8 mg of palladium tetrakis(triphenylphosphine) was added 2.98 g of the product of Part A dissolved in 5 mL of ethyl ether. The reaction mixture was refluxed for 11 hours (internal temperature 88°), then cooled to room temperature. Polymer product precipitated during cooling and was collected by filtration, washed with 100 mL of water and then 200 mL of methanol. After drying at reduced pressure, 1.03 g of powdered polyarylene was obtained. A further 100 mg was obtained from the filtrate by evaporation to dryness followed by a water and methanol wash. GPC resulted in Mn 5000 and Tg 237.6°.

C. Polymerization of 3,5-Dibromobenzene Boronic Acid

The experiment of Part B was repeated except that 100 mL of xylene and 20 mL of 1 M aqueous potassium carbonate solution were used, the reaction mixture was refluxed for 6 h, and the product was precipitated by adding 100 mL of petroleum ether. The polymer was recovered and washed with methanol and water. After vacuum drying, 0.86 g of polymer was obtained.

The above polymerization was successfully repeated 4 times using 1-methylnaphthalene, diphenyl ether, tetrachloroethane and dimethylformamide, respectively, in place of xylene as the solvent. The results are summarized in the Table and show a marked effect of solvent on the molecular weight and polydispersity of the hyperbranched polyarylene products.

| SOLVENT | $\overline{Mn}$ | $\overline{Mw}$ | D |
|---|---|---|---|
| Xylene | 3,820 | 5,750 | 1.50 |
| Me Naphthalene | 6,560 | 13,300 | 2.02 |
| Phenyl Ether | 5,280 | 8,560 | 1.62 |
| Tetrachlorethane | 4,070 | 5,230 | 1.28 |
| Dimethylformamide | 2,000 | 2,750 | 1.38 |

EXAMPLE 2

Preparation and Polymerization of 3,5-Dichlorobenzene Magnesium Chloride

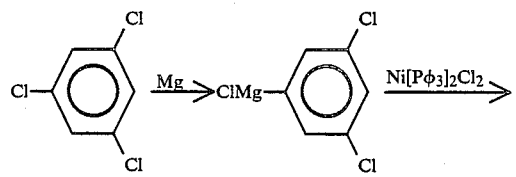

A mixture of 5 g of potassium and sodium alloy (56:44) and 8.89 g of anhydrous magnesium chloride in 200 ml tetrahydrofuran (THF) was stirred at room temperature for one hour before refluxing for two hours. After cooling to room temperature, 13.64 g of 1,3,5-trichlorobenzene in 50 ml of THF was added over 1.5 hours during which time the reaction temperature was maintained below 35° C. The solution was then stirred for 10 hours at room temperature after which 105 mg of bis(triphenylphosphine)nickel dichloride was added, and the resulting reaction mixture refluxed for 24 hours. Most of the THF was removed under reduced pressure and the polymer product precipitated by methanol addition. After two precipitations 5.60 g of polymer was obtained: Tg=236° C.; $\overline{Mn}$=7560; $\overline{Mn}$=17500; D=2.30.

EXAMPLE 3

Derivatization of Bromo-Functional Polyarylene (I)

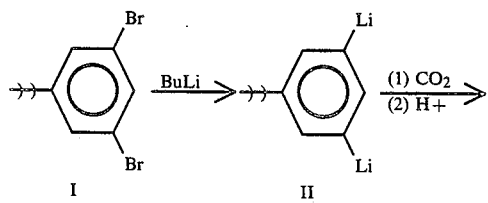

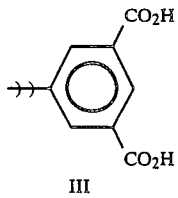

To 5.56 g of the polymer I, prepared by the polymerization of 3,5-dibromobenzene boronic acid as in Example 1B, in 250 mL of THF was added 28 mL of 1.55 M n-butyl lithium in hexane, keeping the temperature below −70° C. After about 10 mL of butyl lithium was added, a precipitate of lithiated polyarylene (II) appeared. Meanwhile, carbon dioxide gas was vigorously bubbled through 250 mL of THF in a 1 L round bottom flask for 15 min, then the solution of II was cannulated into it. $CO_2$ gas addition was continued for a further 20 min and the precipitated II gradually redissolved. The solution was warmed to room temperature and THF was removed under reduced pressure. Diethyl ether was added to precipitate the lithium salt of the carboxylated polymer; yield 5.56 g after drying. The salt was dissolved in water and acidified with 3 N HCl; the polymer III precipitated out and was collected by filtration.

EXAMPLE 4

Reduction of —$CO_2H$ functions in a Polyarylene

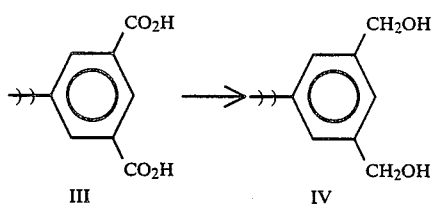

To 2.5 g of polymer III, prepared as in Example 3 and dissolved in 150 mL of THF, was added, at room temperature under argon and via a syringe, 10 mL of 10 M borane methyl sulfide complex. The mixture was refluxed overnight. Excess borane was destroyed with sodium bicarbonate solution, and THF was removed under reduced pressure. The hydroxymethyl derivative IV precipitated and was suspended in water, neutralized with 3 N HCl, then collected by filtration and air-dried. 1.95 g of product was obtained.

A second sample of polyarylene IV, prepared as above, was purified as follows: the impure polymer was Soxhlet-extracted with 10% THF in methanol. The solvent was concentrated to about 20 mL, and 20 mL of methylene chloride and 100 mL of petroleum ether were added. The white polymer thus obtained was filtered and dried under vacuum. The reaction was confirmed by the disappearance of the IR carbonyl peak at 1700 cm$^{-1}$. NMR analysis showed about 70% overall conversion of the bromo-functional polyarylene I to the hydroxymethyl derivative IV.

EXAMPLE 5

Conversion of Hydroxymethyl Functions to Chloromethyl Functions in a Polyarylene To 200 mL of THF was added 10.5 g of triphenyl phosphine and 6.0 g of N-chlorosuccinimide at 0°. After warming to room temperature for 30 min, 3.72 g of the polymer IV from Example 4 was added as a powder. The mixture was stirred for 24 at room temperature and 5 mL of ethanol was added to destroy residual phosphonium complex. THF was removed under reduced pressure, and the precipitated polymer was dissolved in 20 mL of methylene chloride. The white chloromethyl-functional polyarylene (V) was reprecipitated by adding 150 mL of methanol, filtered and dried under vacuum. Yield 2.57 g. The polyarylene structure was confirmed by elemental NMR and IR analysis.

Numerous other derivatives were prepared from polyarylene I either by direct replacement of halogen or by preparing the lithiated derivative II as in Example 3 or by preparing the bromomagnesium (Grignard) derivative and reacting either derivative with various electrophilic reagents to introduce the functions listed on page 9. A Ni (II) catalyst is desirable in reactions of polymeric Grignard reagents.

EXAMPLE 6

Preparation of a Polyarylene-Poly(methyl methacrylate) Star Polymer

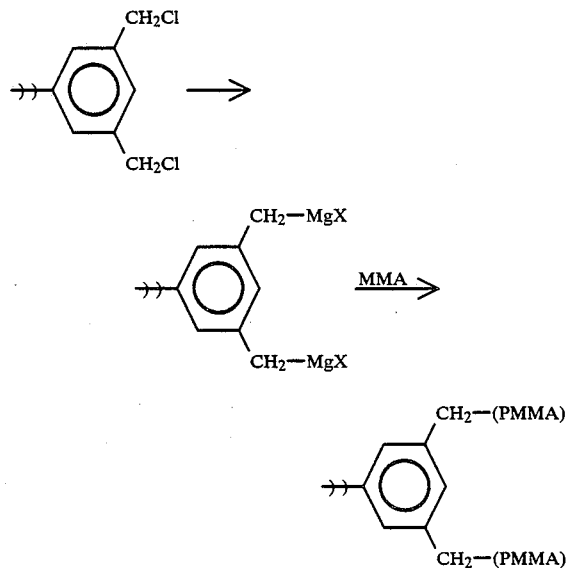

where X is Cl$^-$ or Br$^-$.

To 206 mg of MgBr etherate, 17 mg of lithium and 178 mg of anthracene was added 50 mL of THF under argon. The mixture was stirred overnight. Then 124.6 mg of polymer V prepared as in Example 5 was added as a powder at room temperature. 5.0 mL of methyl methacrylate (MMA) were added via a syringe. An exothermic reaction occurred. The reaction was quenched by addition of ethanol, THF was removed at reduced pressure, and the polymer was precipitated by addition of ethanol. 5.0 g of polymer was obtained. The degree of polymerization (DP) of the PMMA arms was expected from theory to be 65. DP values of 36 and 43 were determined, respectively, by $^{13}$C NMR and GPC. NMR and IR spectra of the PMMA arms indicate a syndiotactic structure; and a single Tg of 127.3° was observed.

A similar star polyarylene-PMMA polymer having a DP of about 8, showed spectra similar to the above star polymer, but two Tg's, at 106.6° and 232.6° were observed.

Two polyarylene-polystyrene star polymers, prepared by substituting styrene for MMA in the above procedure, were found to have DP's (arms) of about 50 and about 7; each exhibited only one Tg, at 105.6° and 143.7° respectively.

EXAMPLE 7

Preparation of a Polyarylene-polystyrene Blend

To 2.0 g of bromo-functional polyarylene I, prepared as in Example 1B, in 500 mL of distilled THF, were added 38.0 g of commercial polystyrene having an Mn of about 260,000. THF was removed slowly at reduced pressure to half its original volume, and the remaining slurry was transferred to an aluminum pan. Solvent was removed completely and the polymeric blend containing 5% of polyarylene I was cut into small pieces and dried under high vacuum for 2 days. A 0.1% blend of polyarylene I, prepared as above, in polystyrene was prepared in a similar manner as a control. The melt viscosity of the 5% blend, determined by capillary rheometry, was about of that of the control at 180° and about 80% of the control at 120°. The decrease in melt viscosity in the presence of the polyarylene is greater at higher shear rates.

In an independent experiment, the molecular weight of the control decreased to 24% of its original value when exposed to air at 220° for 4 h with some shear force applied. Under the same conditions the molecular weight of the 5% blend decreased to 65% of its original value.

EXAMPLE 8

Preparation of Polyarylene

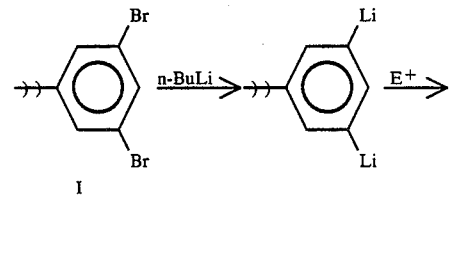

R = H
R = CH$_3$
R = Si(CH$_3$)$_3$

To 200 ml of a THF solution containing 6.20 g of polymer I was added 28.8 ml of 1.6N n-butyllithium in hexane at −78° C. during 15 minutes followed by stirring for 30 minutes at the same temperature. To the cooled reaction mixture was added 10 ml of methanol in 100 ml THF. The cooling bath was then removed and the solution warmed to room temperature. THF was partially removed under reduced pressure and the polymer product precipitated by methanol addition. After drying a vanilla colored powder was obtained. Elemental analysis indicated that 71% of the bromine had been replaced by hydrogen. Similarly prepared polymer, which was quenched with acetonitrile, then methanol, exhibited a Tg=127° C. Methylation and trimethylsilylation were done under similar conditions with dimethyl sulfate and trimethylsilyl chloride respectively.

| R | Reagent | Conversion (%) | method | Tg (°C.) |
|---|---------|----------------|--------|----------|
| H | Acetonitrile | | | 127 |
| H | Methanol | 81 | (anal.) | |
| CH$_3$ | Dimethyl Sulfate | 74 | (NMR) | 179 |
| TMS | Trimethylsilyl Chloride | 87 | (NMR) | 152 |

EXAMPLE 9

Preparation of an Acetylenic Polyarylene

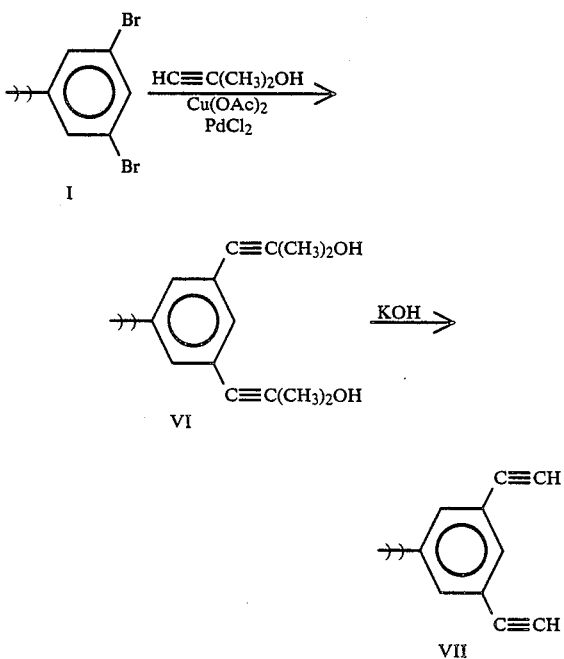

To 15.50 g of polymer I in 500 ml of THF was added 10.7 ml of 2-methyl-3-butyn-2-ol, 1.83 g triphenylphosphine, 244 mg cupric acetate, 108 mg PdCl$_2$ and 41.8 mg triethylamine. The solution was degassed quickly twice followed by refluxing for 48 hours. After cooling to room temperature, the reaction mixture was filtered and the precipitate was washed with THF. The filtrate was concentrated to 50 ml and polymer VI was precipitated by methanol addition. Proton NMR indicated 32% substitution by the 2-methyl-3-butyn-2-ol group. To a solution of polymer VI in 150 ml of dry THF was added 4.0 g of dry powdered potassium hydroxide. The reaction mixture was refluxed for one hour after which acetone was removed by azeotropic distillation. When the solvent volume was reduced to 20 ml, the mixture was cooled, and another 150 ml of THF added. Azeotropic distillation was repeated twice. After this treatment, the polymer was dissolved in 20 ml of THF, insolubles removed by filtration, and the solution poured into 100 ml of methanol. The resulting precipitate was collected by filtration and dried under vacuum at room temperature to yield 3.57 g of polymer VII. The infrared spectrum of the product exhibited two peaks characteristic of acetylenic groups at 3300 and 2100 cm$^{-1}$.

EXAMPLE 10

Preparation of a Bromomethyl Polyarylene

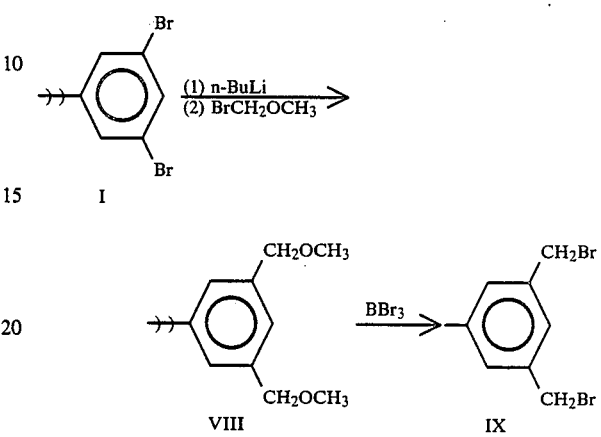

To 15.50 g of the polymer I, prepared by the polymerization of 3,5-dibromobenzene boronic acid as in Example 1B, in 500 ml of THF was added 70 ml of 1.6N n-butyllithium in hexane at −78° C. The addition took about an hour, after which the reaction mixture was stirred for an additional 30 minutes at −78° C. To this slurry was added 10.0 ml of bromomethyl methyl ether in 50 ml of THF. The mixture was slowly warmed to room temperature, after which 50 ml of conc. NH$_4$OH solution was added. Polymer VIII was precipitated by methanol addition. NMR analysis indicated 68% substitution of the methoxymethyl group, while elemental analysis indicated 75% replacement. To 5.0 g of polymer VIII in 200 ml of methylene chloride was added 5 ml of boron tribromide at −78° C., stirred for one hour at that temperature, and then warmed to room temperature during one hour. After about an additional 30 minutes at room temperature, the solution was cooled to 0° C., and 10 ml of a sodium bicarbonate solution added. Methylene chloride was evaporated and 200 ml of methanol added. Polymer IX was filtered, suspended in 200 ml water for 30 minutes, refiltered, and washed with methanol. Polymer IX was dried under high vacuum overnight. Elemental analysis indicated 50% substitution of bromomethyl groups.

EXAMPLE 11

Preparation of an Amido Polyarylene

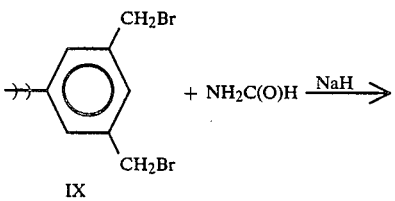

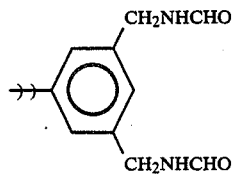

The oil was removed from 4.8 g of a 50% sodium hydride/oil dispersion by washing twice with 20 ml of toluene. To this was added 200 ml of dimethyl acetamide, which had been dried overnight over 5A molecular sieves, and 4.50 g formamide. The reaction mixture was stirred for 45 minutes, 1.00 g polymer IX added, and then heated at 60° C. for 5 hours; during this time a light yellow fine precipitate settled to the bottom of the flask. After cooling to room temperature, about 10 ml of methanol was added, and the solution poured into 300 ml of chilled water. A white flocculant precipitate was collected by filtration and dried overnight. The polymer was dissolved in 100 ml dimethyl acetamide and insolubles separated by filtration. The filtrate was poured into 100 ml water, the precipitated polymer collected by filtration, and then dried to obtain 0.41 g of product which displayed peaks characteristic of amide groups at 1635 cm$^{-1}$ and 1675 cm$^{-1}$ in the infrared spectrum. Reaction with acetamide afforded acetyl aminomethyl ended polymer which displayed an amide peak in the infrared spectrum at 1630 cm$^{-1}$.

EXAMPLE 12

Preparation of an Acid Chloride Functional Polyarylene

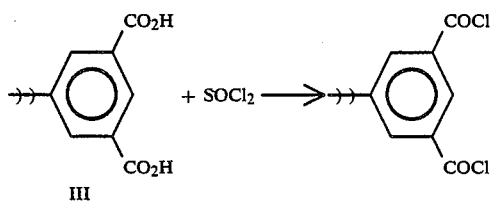

To 360 mg of polymer III, with carboxylic end groups, in 5 ml THF, was added 395 mg pyridine and 590 mg thionyl chloride at room temperature under a nitrogen atmosphere. The reaction mixture was stirred for three days, insolubles separated by filtration, followed by evaporating the solvent to dryness An orange colored material, 300 mg, which displayed an infrared carbonyl peak of 1770 cm$^{-1}$ was obtained.

I claim:

1. A soluble hyperbranched polyarylene having
   (i) at least one branch per 10 repeating monomer units;
   (ii) $(n-1)x+1$ functional groups selected from Br, I or Cl wherein n is the number of halogen atoms per monomer and is at least 2, and x is the number of repeating monomer units; and
   (iii) a spherical diameter of less than 1000 Angstrom units.

2. A polyarylene as in claim 1 wherein the spherical diameter is less than 100 Angstrom units.

3. A blend comprising up to 50 mole percent of the polyarylene of claim 1.

* * * * *